United States Patent [19]

Drouet et al.

[11] Patent Number: 5,017,754

[45] Date of Patent: May 21, 1991

[54] PLASMA REACTOR USED TO TREAT POWDER MATERIAL AT VERY HIGH TEMPERATURES

[75] Inventors: Michel G. Drouet, St Bruno; Hyun K. Choi, St Lambert, both of Canada

[73] Assignee: Hydro Quebec, Montreal, Canada

[21] Appl. No.: 399,997

[22] Filed: Aug. 29, 1989

[51] Int. Cl.$^5$ ............................................. B23K 9/00
[52] U.S. Cl. ...................... 219/121.36; 219/121.48; 219/121.52; 75/10.19; 75/10.22; 373/22
[58] Field of Search ................... 219/121.36, 121.59, 219/121.48, 121.52, 121.51, 121.55, 121.5; 75/10.1, 10.19, 10.23, 10.39, 10.22; 373/18-23

[56] References Cited

U.S. PATENT DOCUMENTS

| | | | |
|---|---|---|---|
| 3,743,781 | 7/1973 | Holden | 373/18 |
| 3,856,918 | 12/1974 | Skrivan et al. | 423/69 |
| 3,932,171 | 1/1976 | Tylko | 75/10 R |
| 4,002,466 | 1/1977 | MacRae et al. | 75/11 |
| 4,154,972 | 5/1979 | Tylko | 13/2 P |
| 4,361,441 | 11/1982 | Tylko | 373/22 |
| 4,466,824 | 8/1984 | Gauvin et al. | 75/10 R |
| 4,533,385 | 8/1985 | Lugscheider et al. | 75/10.1 |
| 4,644,557 | 2/1987 | Ebeling et al. | 373/22 |
| 4,864,096 | 9/1989 | Wolf et al. | 75/10.2 |

*Primary Examiner*—M. H. Paschall
*Attorney, Agent, or Firm*—Foley & Lardner

[57] ABSTRACT

Disclosed is a plasma reactor for use to treat ores or other material at a very high temperature in order to physically or chemically transform the same. The reactor comprises a vertical, electrically insulated sleeve disposed at the upper end with a hollow torch of a conventional structure, for use to generate a plasma column. A gas is tangentially injected into the torch to create a vortex inside the same. The material to be treated is dropped, in powder form, vertically downward inside the sleeve from the upper end thereof, beside the hollow torch, so as to form a substantially uniform cylindrical curtain of particles falling down into the sleeve. The particles that are centrifugally projected against the internal wall of the sleeve by the vortex escaping from the hollow torch, entirely cover the internal wall of the sleeve and shield, while simultaneously being treated by heat generated by the plasma arc column. The reactor further comprises a crucible positioned under the sleeve to collect the treated particles in molten form, which drip down from the sleeve at the lower end thereof. The plasma column may be generated by the hollow torch exclusively, when the reactor is intended to be used in a non-transferred arc mode. The reactor may also be used in a transferred arc mode. In such a case, the arc is transferred to a melt contained in the crucible. Another electrode is provided for this purpose at the bottom of this crucible, and is electrically connected to the power supply.

3 Claims, 1 Drawing Sheet

PLASMA REACTOR USED TO TREAT POWDER MATERIAL AT VERY HIGH TEMPERATURES

BACKGROUND OF THE INVENTION (a) Field of the Invention

The present invention relates to an improved plasma reactor for use to treat ores or other metallic or non metallic compounds at a very high temperature in order to physically or chemically transform the same.

(b) Description of the Relevant Art

Plasma reactors are well known devices that have been made the subject of numerous research and development over the last decades. By definition, such reactors make use of a plasma, forming a heat generating arc column between a set of electrodes to heat the ores or compounds to be treated at very high temperatures and thus allow reactions to occur that would not be obtainable otherwise. The plasma forming the arc column consists of a mixture of energized and/or dissociated molecules, positively charged ions and free electrons obtained from a gas (hereinafted called "plasma gas") subjected to partial ionization by means of an electric arc (usually d.c.) formed between an anode and a cathode.

In practice, the plasma gas may often be used as a reactant. Thus, by way of example, oxygen or air can be used for carrying out oxidation. Carbon monoxyde or hydrogen can be used for carrying out reduction. Chlorine can be used for carrying out chlorination and nitrogen for nitration.

The plasma reactors that are presently available make use of devices called "plasma torches" to initiate and maintain the plasma in the reactor. These plasma torches may be of two different designs.

According to one of these designs called "hollow torch" the plasma torch comprises two tube-shaped electrodes made of copper or stainless steel, that are coaxially aligned and whose ends are kept apart by means of a small insulating ring. The plasma gas is injected between the electrodes through a hole made in the insulating ring. The plasma generated by the arc formed between the electrodes emerges from the torch whose electrodes act as a nozzle, and forms a jet of very high velocity.

It is of conventional practice to inject the gas tangentially in such a hollow torch to create a vortex and thus stabilize the arc along the axis of the nozzle. It is also conventional to use in some cases magnetic coils around one or both electrodes. This forces the points of attachment of the arc to the electrodes to rotate thereby reducing the risk of erosion over the electrode surface. It is further conventional to cool the electrodes with water jackets in order to increase their life expectancy.

According to the other design hereinafter called "solid torch", the plasma torch comprises a solid cathode usually in the form of a tip of tungsten, which is centrally held by an insulator inside a hollow anode. The plasma gas is injected in the annular space between the tungsten tip and its surrounding anode.

Once again, it is of conventional practice to incorporate cooling means to such a solid torch in order to increase the life expectancy of its components, and more particularly of its tungsten tips.

Whatever be the design of the plasma torch being used in the reactor may be, there are two basic approaches to using this torch and to operating the reactor.

One of these approaches consists of using the torch to generate a plasma flame, which is projected onto the material to be treated, in order to heat the same at the requested treatment temperature. In this approach, the plasma arc column permanently extends between the "built-in" anode and cathode of the torch, even if this column may be blown out of the same at a given distance by the injected plasma gas, and form an elongated loop.

The other approach consists of using the plasma torch and more particularly, the two built-in electrodes of the torch to generate a plasma arc column therebetween just at the beginning of the process, and subsequently transferring the so generated arc column to the material being treated which is usually in a molten form in the bottom of the reactor. Such an arc transfer is achieved in practice by switching one of the power source connections from the downstream electrode in the case of a hollow torch, or from the sleeve-shaped anode in the case of a solid torch, to another electrode (usually an anode) in contact with the bath of molten material at the bottom of the reactor.

Of course, this arc-transfer approach can only be used if the molten material being treated is electrically conductive. However, when this approach is used, it has several advantages:

it avoids anode heat loss;
it distributes the arc power more evenly inside the reactor; and
it keeps the bath hot at the bottom of the reactor (although it may overheat the point thereof where the arc strikes down).

U.S. Pat. No. 3,856,918 assigned to AMERICAN CYANAMID COMPANY discloses a non-transferred arc plasma reactor comprising a solid or hollow torch axially mounted on top of a vertical sleeve. The material to be treated is injected pneumatically at an angle on top of the sleeve, just under the torch, so as to impinge on the internal wall of the sleeve and flow down the same into a crucible. Meanwhile, it is heated by the plasma flame blown by the torch into the sleeve.

U.S. Pat. No. 4,002,466 assigned to BETLEHEM STEEL CORPORATION discloses a transferred arc plasma reactor comprising a solid torch axially mounted on top of a vertical sleeve or "collimator". The arc is transferred from the cathodic tip of the torch to the internal wall of the collimator which is connected to the power source and acts as an anode. The material to be treated is pneumatically injected tangentially near the top of the collimator and forms a falling film on the internal surface of the collimator. The arc strikes this film randomly while it flows down, and thus heats the material to the desired treatment temperature, before it falls into a crucible. The main advantage of this reactor is that the falling film protects the internal surface of the collimator acting as the anode and thus decreases the rate of erosion of the same. It also acts as a thermal insulator and thus decreases the heat loss at the anode which is externally cooled.

U.S. Pat. Nos. 3,932,171 and 4,154,972 both assigned to TETRONICS RESEARCH AND DEVELOPMENT COMPANY LTD. disclose a transferred arc plasma reactor in which the arc column is transferred from the cathode of a hollow torch to a bath of molten material in contact with an annular anode. The hollow torch is mounted at an angle on top of the reactor and is made to orbit about a vertical axis coaxial to the anode in order to permanently aim at the same. The material to be treated is merely dropped downwardly into the reactor through a plurality of openings surrounding the torch on top of the reactor. This forms a substantially uniform cylindrical falling curtain which is "swept" and heated by the plasma arc column while the torch is rotating.

Last of all, U.S. Pat. No. 4,466,824 originally granted to NORANDA MINES LTD. and subsequently assigned to HYDRO QUEBEC, discloses a transferred arc plasma reactor of substantially the same design as the one disclosed in the above mentioned U.S. Pat. No. 4,002,466, except that the anode is located at the bottom of the crucible, where the molten material flowing from the sleeve or collimator drops down. Of course, the collimator, in which the material to be treated is tangentially injected, is electrically insulated from the anodic bath, so that the arc extends through the sleeve between the cathodic tip of the torch and the bath formed by the drops of material molten along the sleeve by the heat generated by the plasma arc column. In this embodiment, the solid torch is also vertically movable to bring the cathodic tungsten tip close to the bath in order to start the process. The material in powder form is also projected by a carrier gas against the internal surface of the sleeve to form the requested falling film, which advantageously acts as a shield and thus limits wear of the sleeve surface, and heat loss through the same.

The main advantage of the design in U.S. Pat. No. 4,466,824 over the other known designs, including the one in U.S. Pat. No. 4,002,466 is essentially that it increases the thermal efficiency of the process. However, the design in U.S. Pat. No. 4,466,824 has the same major disadvantage as the other known designs of the same type, namely, the absolute necessity of using a carrier gas under substantial pressure to carry the pulverulent material to be treated through feed pipes leading from a storage hopper to the reactor and then injecting this material tangentially with a sufficient velocity to create a uniform cylindrical film covering the whole internal surface of the sleeve.

SUMMARY OF THE INVENTION

An object of the present invention is to provide a plasma reactor which is free of the above mentioned disadvantage of all the existing reactors.

More particularly, an object of the invention is to provide a plasma reactor having an improved design which "combines" features up to now consider as incompatible in the various existing reactors of both the non-transferred and transferred arc types, in such an advantageous manner as to avoid most of the above mentioned drawbacks.

Another object of the invention is to provide a plasma reactor which is fully convertible, whereby it can be "switched" from use for a non-transferred arc treatment to use for a transfer arc treatment and vice-versa, whenever desired.

In accordance with the invention, these objects and others are achieved with a plasma reactor for use to treat a material in powder form at a very high temperature, which reactor comprises:
- a vertical electrically insulated sleeve having an upper end, a lower end and an internal wall cylindrical in shape;
- a hollow torch coaxially mounted at the upper end of the sleeve, the torch comprising at least one tube-shaped electrode coaxial with the sleeve for use to generate a plasma arc column;
- means for injecting a gas tangentially into the hollow torch in order to create a vortex inside the same and thus stabilize the plasma arc column extending from the tube-shaped electrode.;
- means for dropping the powder material to be treated vertically downwardly inside the sleeve from the upper end thereof beside the hollow torch, so as to form a substantially uniform cylindrical curtain of particles falling down into the sleeve, these particles being centrifugally projected against the internal wall of the sleeve by the vortex escaping from the hollow torch and entirely covering the internal wall to shield the same while they are being simultaneously treated by the plasma column;
- a crucible positioned under the sleeve to collect the treated particles in molten form that drip down from the sleeve at the lower end thereof; and
- another electrode cooperating with the tube-shaped electrode of the hollow torch to generate the plasma arc column by proper connection of both of these electrodes to an electric power source.

As can be understood, the plasma reactor according to the invention does not call for a pneumatic injection of the material to be located at the upper end of a sleeve, and therefore does not request the use of a pressurized carrier gas to feed the material on top of the sleeve. Rather, it makes use of a material feeding system that may be exclusively mechanical and is actually very similar to the one used in in U.S. Pat. Nos. 3,932,171 and 4,154,972, whose system is very simple and efficient and much less subject to clogging than the pneumatic tangential injection system.

The plasma reactor according to the present invention also uses a hollow torch of conventional structure instead of a solid torch. The hollow torch is known to be of longer duration than any solid torch whose tungsten tip is subject to severe heating and has to be frequently changed.

In accordance with the present invention, the projection of the particles of material to be treated against the internal wall of the sleeve is exclusively carried out by the vortex generated by the plasma gas inside the hollow torch, wherein the vortex "expands" when the gas leaves the torch.

Depending on where the "other" eletrode is located, the plasma reactor according to the invention may operate as a transferred arc plasma reactor, or as a non-transferred arc plasma reactor.

To operate in the above mentioned first mode, the other electrode is located in the curcible and is in electrical contact with the molten material collected in the crucible to cause arc transfer from the tube-shaped electrode of the hollow torch to the molten material with the generated plasma arc column extending vertically through the sleeve. It is worth mentioning that, in this particular mode, the other electrode in the crucible does not have to be the anode as in U.S. Pat. No. 4,466,824. As a matter of fact, it may be either the anode or the cathode depending on the polarity of the electrode in the hollow torch.

To operate in the second mode, where the arc is not transferred to the material, the "other" electrode merely consists of the other tube-shaped electrode, which forms part of any standard hollow torch.

Advantageously, the plasma reactor, according to the invention may incorporate both of said "other" electrodes together with suitable switching means known per se to connect either one of the other electrodes or the other to the power source. Thus, the plasma reactor becomes fully convertible and can be used in any of the above mentioned modes, depending on the kind of material to be treated, such as, for example glass which is not conductive. In all cases, the means used for dropping the power material may include a plurality of openings located around the hollow torch at the upper end of the sleeve, through which the powder material is fed essentially by gravity into the sleeve, close to the internal wall thereof. The material may be supplied to these openings directly, via an endless screw or any similar means leading from the material storage hopper. Alternatively, the material may be supplied pneumatically at rather low pressure, as is disclosed in U.S. Pat. No. 4,154,972.

The main advantage of the plasma reactor according to the invention which uses a vortex-generated hollow torch instead of a tunsten tip torch can be listed as follows:

(a) It eliminates the use of a tungsten-tip electrode and its need for special arc gas and for protection from oxidation.

(b) The process may use any gas. By way of example, CO may be use as a good reducing plasma gas compatible with the copper electrode of the standard hollow torch.

(c) The hollow torch uses more plasma gas than the tungsten torch. The higher gas flow rate generates a strong tangential force which will assist the material feed injection. As a result, variable-size feed material may be dropped into the feed pipe.

(d) The hollow torch is known to generate a stable plasma arc column. This permits to use of a tall sleeve pipe, for a long residence time for melting/smelting.

(e) Restarting the hollow torch in case of arc outage is quite simple simple as compared to a solid torch where one always worries of tungsten-tip oxidation.

(f) The electrodes may be of any polarity needed for the process.

BRIEF DESCRIPTION OF THE DRAWINGS

The invention will be better understood upon reading the following description of a preferred embodiment thereof, given in connection with the accompanying drawings in which.

DESCRIPTION OF A PREFERRED EMBODIMENT

Figure 1:
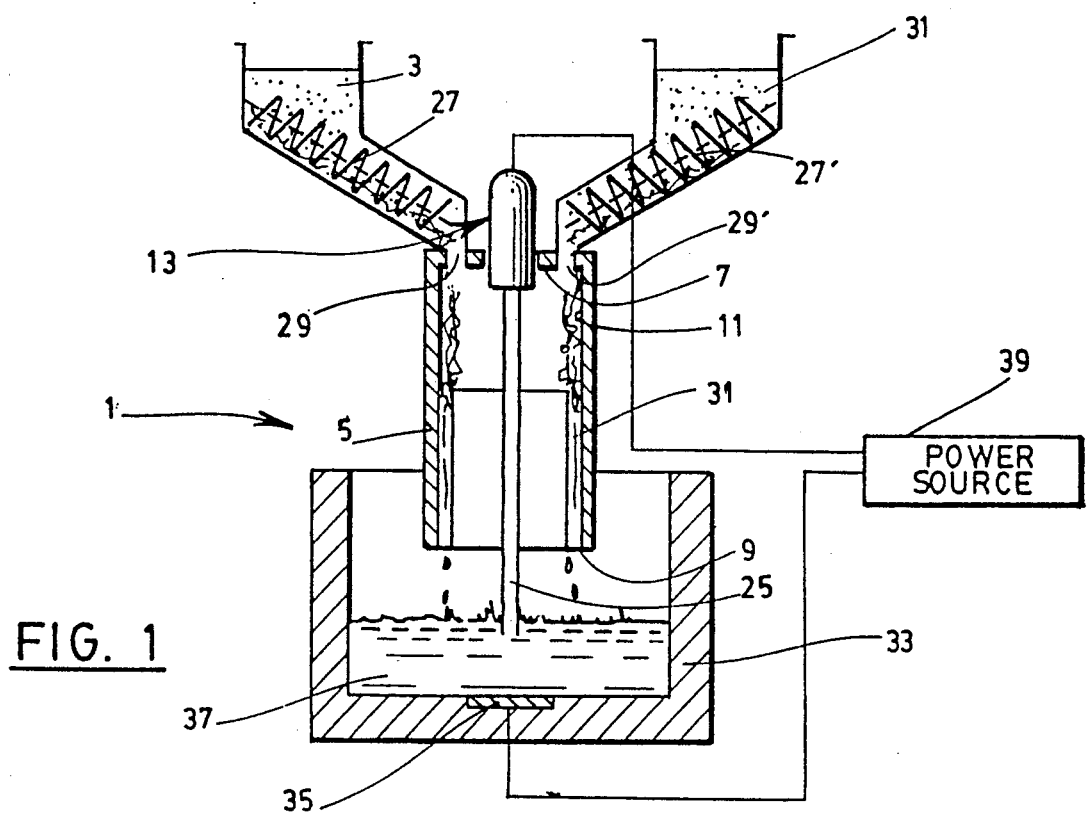
FIG. 1 is a diagrammatic vertical section of a plasma reactor according to the invention.

The plasma reactor 1 according to the invention as shown in FIG. 1 is intended to be used to treat a material stored in a powder form into a plurality of storage hoopers 3 preferably located above the reactor.

The reactor 1 comprises a vertically extending, electrically insulated sleeve 5 having an upper end 7 closed by a wall, a lower end 9, and an internal wall 11 that is cylindrical in shape.

Figure 2:
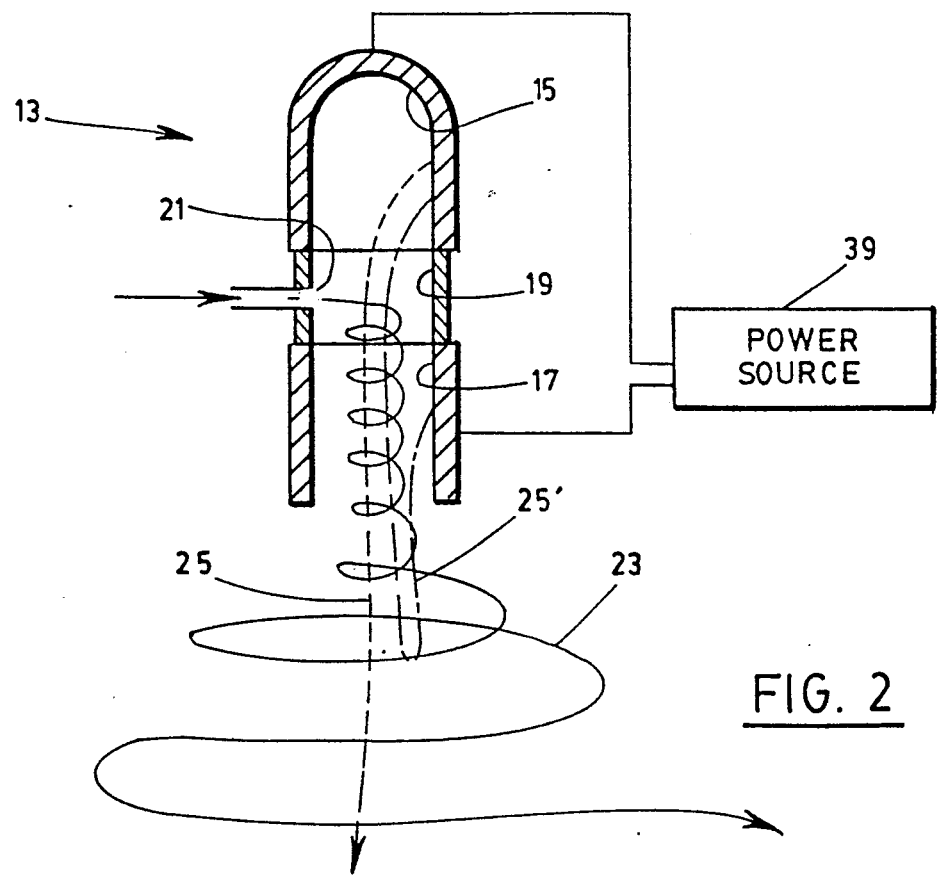
FIG. 2 is a diagrammatic vertical section of the hollow torch used in the plasma reactor shown in FIG. 1.

The reactor 1 also comprises a hollow torch 13 which is shown in greater details in FIG. 2. The torch 13 which is coaxially mounted on top of the sleeve 5, comprises a pair of tube-shaped electrodes 15 and 17, that can be made of copper or stainless steel or any other suitable materials and are coaxially aligned with respect to each other and to the sleeve. The electrodes 15 and 17 are kept apart by a small insulating ring 19 comprising at least one hole 21 through which a gas known per se, such as nitrogen, carbon oxide and the like, may be injected tangentially in order to create a vortex shown by the arrow 23, inside and outside the hollow torch 13. The basic structure of this hollow torch is well known per se and torches of this type are commercially available from different companies such as, for example, PLASMA ENERGY CORP.

The advantage of injecting a gas tangentially into a hollow torch is essentially to create a vortex 23 inside the same and thus stabilize the plasma arc column 25 or 25' generated by this torch, as will now be explained hereinafter.

The reactor 1 further comprises a means for dropping the powder material stored in the hooper 3, 3' vertically downwardly inside the sleeve 5. This means may consist of endless screw conveyor 27, 27', leading from the bottom of the storage hooper 3, 3' down to openings 29, 29' provided in the upper wall 7 of the sleeves all around the torch 13, close to the internal wall 11 in order to form a substantially uniform cylindrical curtain 31 of particles of material that fall down by gravity into the sleeve 5.

In operation, these particles are centrifugally projected against the internal wall 11 of the sleeve 5 by the vortex 23 escaping from the hollow torch 13, when this vortex expands out just at the outlet of the electrode 17. As a result, these particles entirely cover the internal wall 11 and shield the same, while they are simultaneously treated by the plasma arc column generated inside the reactor.

The reactor further comprises a crucible 33 positioned under the sleeve 5 to collect the treated particles in molten form which drip down from the sleeve 5 at the lower end thereof. The crucible 33 may be provided with an electrode 35 located in its bottom wall so as to be in electrical contact with the molten material collected in the form of a bath 37 inside this crucible.

In one embodiment of the invention, this electrode 35 may be activated by connection to a power source 39, so as to cooperate with one of the tube-shaped electrodes of the torch 13, say electrode 15, in order to generate the plasma arc column 25 extending from this electrode 15 down to the bath 37. In this particular embodiment, the plasma reactor 1 operates in a transferred arc mode with the generated plasma arc, extending vertically from the upper end of the torch down to the molten material forming the bath 37.

Another embodiment of the invention can be used either to start the plasma arc column prior to transferring it to the bath or for certain other applications for example, when the material to be treated is not conductive, the "other" electrode, which is connected together with the electrode 15 to the power source 39 is the other tube-shaped electrode 17 of the torch. In this particular case, the arc 25' (see FIG. 2) is not transferred but merely pushed by the plasma gas to form a loop emerging out from the torch and extending centrally downward inside the sleeve 5. Of course, the transferred, which extends as disclosed hereinabove inside the sleeve 5, heats the same and causes the curtain of particles being dropped through the openings 29 and 29' to melt and react as desired. Advantageously, means (not shown) can be used to switch off and on electrodes 17 and 35, whenever required.

The industrial applications of the above plasma reactor are, of course, identical to those of all the existing reactors such as those disclosed in the U.S. patents briefly commented on in the "background of the invention", supra. All of these applications, such as reduction of metal oxides (iron ores, alumina), etc...., the benefication of titaniferious ores, sintering or melting of particulate materials such as ceramics, etc.... are well known in this art and need not be described in greater detail.

Similarly, all the operation control and/or safety systems (gas purification system, arc starter, torch motion up ad and down inside the sleeve water cooling etc. ...), that can be incorporated to the plasma reactor according to the invention to make it industrially operative, are well known in the art and need not be described in detail. The invention is only restricted to what is recited in the appended claims.

The embodiments of the invention in which an exclusive property or privilege is claimed are defined as follows:

1. A plasma reactor for use to treat an electrically conductive material in powder form at a very high temperature, said reactor comprising:
   a vertical electrically insulated sleeve having an upper end, a lower end and an internal wall cylindrical in shape;
   a hollow torch coaxially mounted at the upper end of the sleeve, said torch comprising at least one tube-shaped electrode coaxial with said sleeve for use to generate a plasma arc column;
   means for injecting a gas tangentially into said hollow torch in order to create a vortex inside the same;
   means for dropping the powder material to be treated vertically downwardly inside the sleeve from the upper end thereof beside the hollow torch so as to form a substantially uniform cylindrical curtain of particles falling down into the sleeve, said particles being centrifugally projected against the internal wall of said sleeve by the vortex escaping from the hollow torch and entirely covering said internal wall to shield the same while they are being simultaneously treated by said plasma column;
   a crucible positioned under the sleeve to collect the treated particles in molten form that drip down from the sleeve at the lower end thereof; and
   another electrode cooperating with said at least one tube-shaped electrode of said hollow torch to generate said plasma column by proper connection of both of said electrodes to an electric power source, said other electrode being located in said crucible and being in electrical contact with the molten material collected in said crucible to cause arc transfer from said at least one tube-shaped electrode of said hollow torch to said molten material with the generated plasma arc column extending vertically through said sleeve,
   wherein said means for dropping the powder material includes a plurality of openings which are located around the hollow torch at the upper end of the sleeve and through which the powder material is fed essentially by gravity into the sleeve, said openings being vertically extending and closely adjacent to the internal wall of said sleeve.

2. The plasma reactor for use to treat a material in powder form at a very high temperature, said reactor comprising:
   a vertical electrically insulated sleeve having an upper end, a lower end and an internal wall cylindrical in shape;
   a hollow torch coaxially mounted at the upper end of the sleeve, said torch comprising a pair of tube-shaped electrodes coaxial with said sleeve for use to generate a plasma arc column, by proper connection of both of said electrodes to an electric power source, said tube-shaped electrodes being kept apart from each other by an insulating ring;
   means for injecting a gas tangentially into said hollow torch in order to create a vortex inside the same, said means including a hole provided in said insulating ring, through which said plasma gas is injected into said hollow torch;
   means for dropping the powder material to be treated vertically downwardly inside the sleeve from the upper end thereof beside the hollow torch, so as to form a substantially uniform cylindrical curtain of particles falling down into the sleeve, said particles being centrifugally projected against the internal wall of said sleeve by the vortex escaping from the hollow torch and entirely covering said internal wall to shield the same while they are being simultaneously treated by said plasma column; and
   a crucible positioned under the sleeve to collect the treated particles in molten form that drip down from the sleeve at the lower end thereof;
   wherein said means for dropping the powder material includes a plurality of openings which are located around the hollow torch at the upper end of the sleeve and through which the powder material is fed essentially by gravity into the sleeve, said openings being vertically extending and closely adjacent to the internal wall of said sleeve.

3. A plasma reactor for use to treat a material in powder form at a very high temperature, said reactor comprising:
   a vertical electrically insulated sleeve having an upper end, a lower end and an internal wall cylindrical in shape;
   a hollow torch coaxially mounted at the upper end of the sleeve, said torch comprising at least one tube-shaped electrode coaxial with said sleeve for use to generate a plasma arc column;
   means for injecting a gas tangentially into said hollow torch in order to create a vortex inside the same and thus stabilize the plasma arc column extending from said at least one tube-shaped electrode;
   means for dropping the powder material to be treated vertically downwardly inside the sleeve from the upper end thereof beside the hollow torch, so as to form a substantially uniform cylindrical curtain of particles falling down into the sleeve, said particles being centrifugally projected against the internal wall of said sleeve by the vortex escaping from the hollow torch and entirely covering said internal wall to shield the same while they are being simultaneously treated by said plasma column;
   a crucible positioned under the sleeve to collect the treated particles in molten form that drip down from the sleeve at the lower end thereof; and
   two other electrodes cooperating with said at least one tube-shaped electrode of said hollow torch to generate said plasma column by proper connection of both of said electrodes to an electric power source, said other electrodes being connectable independently to said power source depending on the kind of arc transfer requested for the treatment, one of said other electrodes being located in said crucible and in electrical contact with the molten material collected in said crucible to cause arc transfer from said at least one tube-shaped electrode of said hollow torch to said molten material with the generated plasma arc column extending vertically through said sleeve, the other of said other electrodes consisting of another tube-shaped electrode forming part of said hollow torch, said other tube-shaped electrode being coaxially aligned with said at least one tube-shaped electrode and kept apart from the same by an insulating ring comprising a hole through which said plasma gas is injected into said hollow torch, wherein said means for dropping the powder material includes a plurality of openings which are located around the hollow torch at the upper end of the sleeve and through which the powder material is fed essentially by gravity into the sleeve, said openings being vertically extending and closely adjacent to the internal wall thereof.

* * * * *